United States Patent Office 2,934,812
Patented May 3, 1960

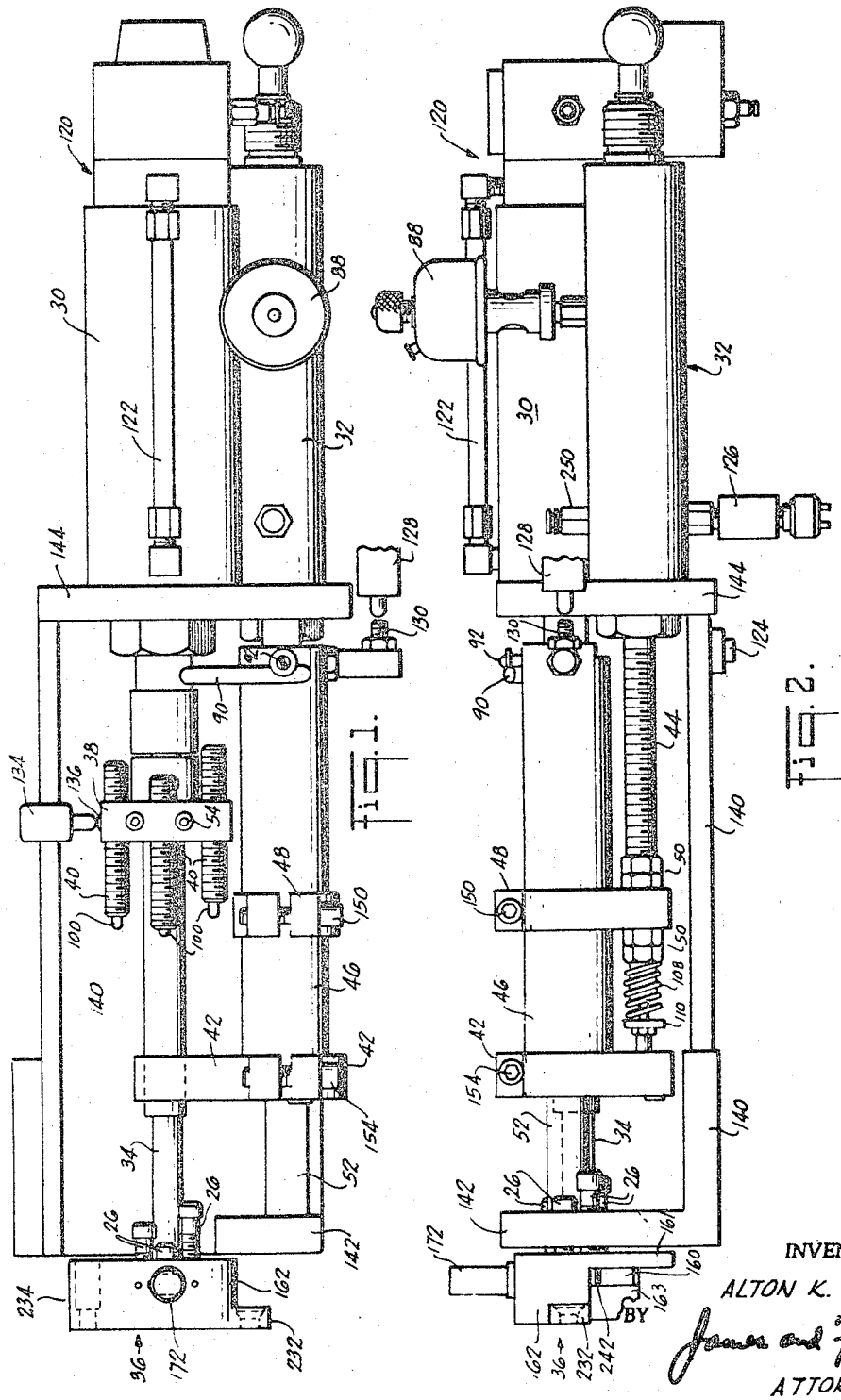

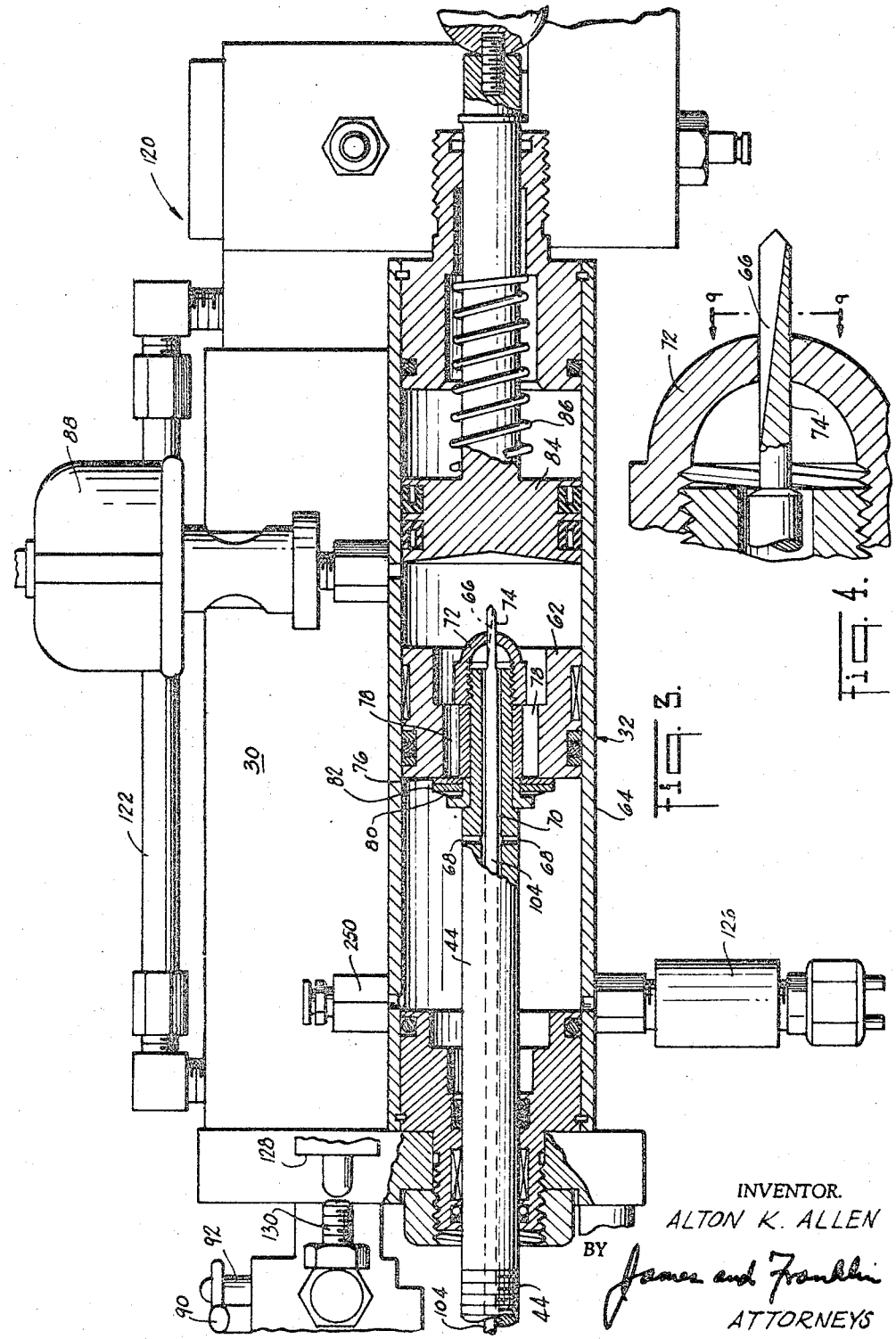

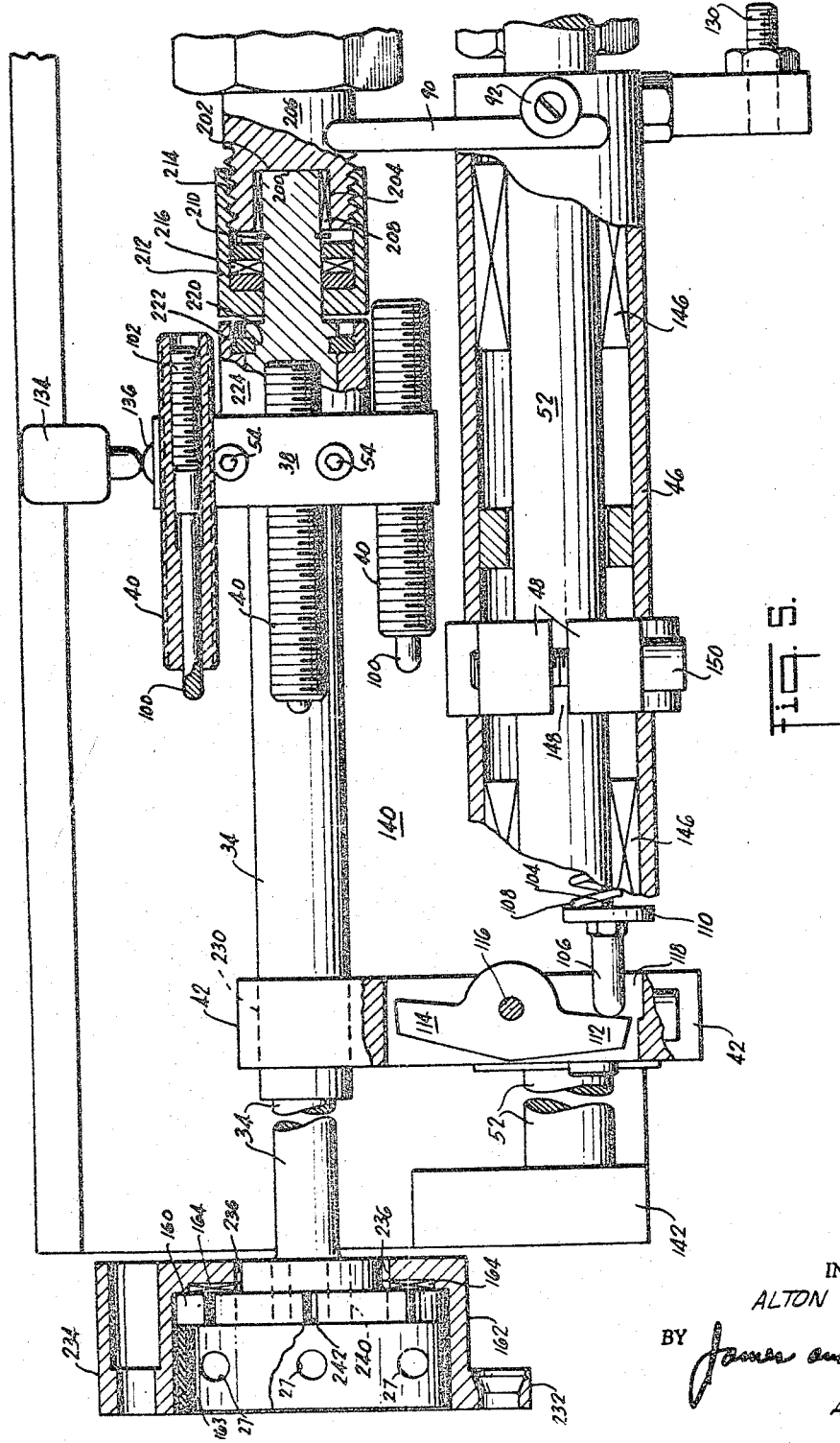

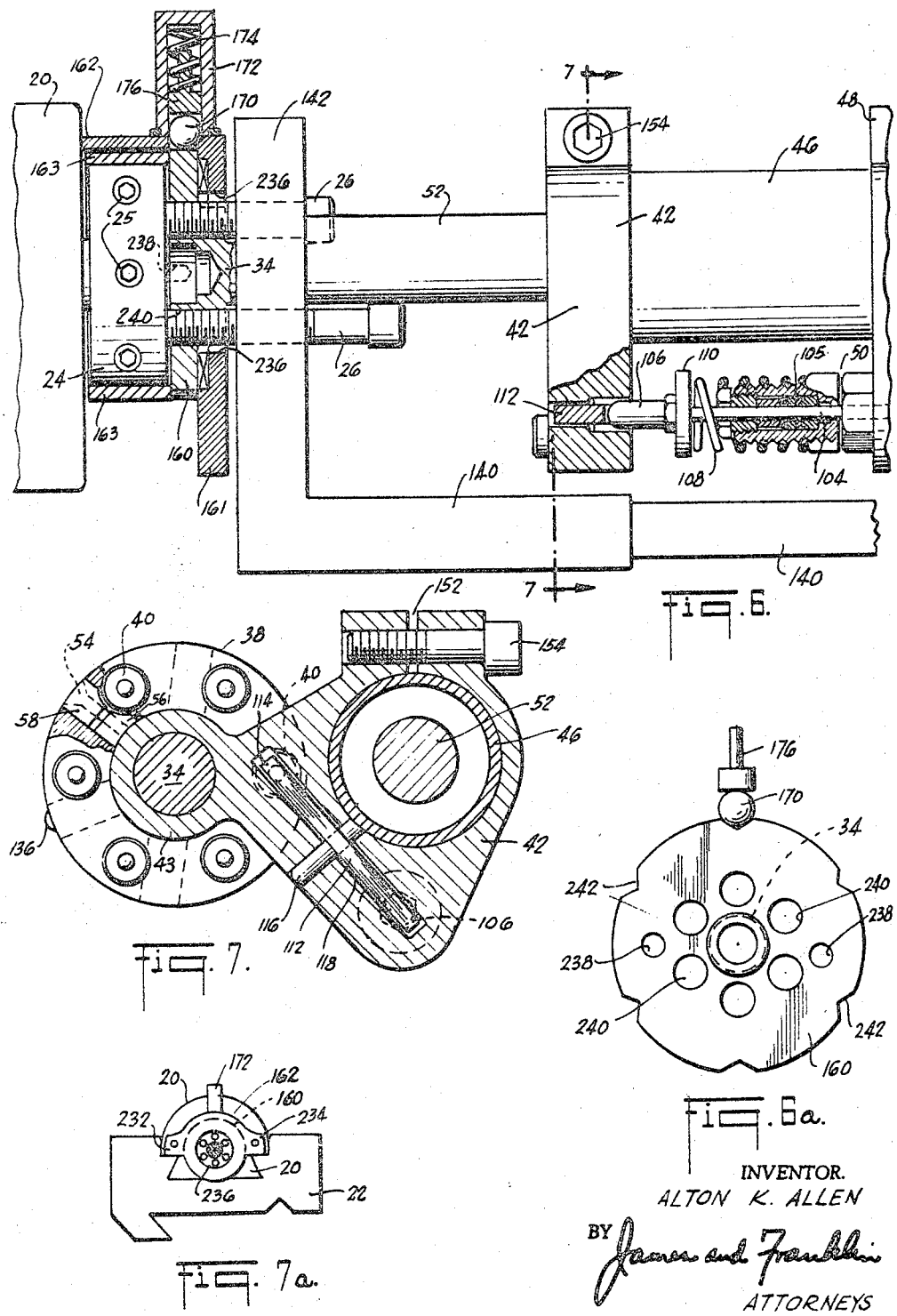

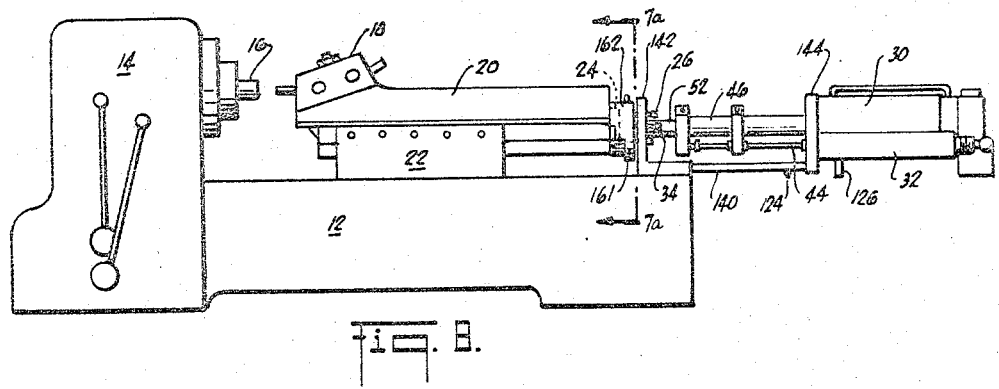

2,934,812

POWER FEED MECHANISM FOR TOOL TURRET

Alton K. Allen, New Hyde Park, N.Y.

Application April 28, 1958, Serial No. 731,424

13 Claims. (Cl. 29—42)

This invention relates to hand screw machines, and more particularly to an accessory which provides powerized operation of the tool-carrying turret.

In a hand screw machine, the tail stock is replaced by a tool-carrying turret which is slidably mounted, and which is moved up to the work by a lever. Each time the turret is retracted, it is indexed to the next station. Appropriate stop-screws are provided to limit the permitted forward movement, independently adjustable for each station. It has already been proposed to powerize the turret by using an air-operated or other motor cylinder to advance and retract the turret, including additional means whereby the approach to and return from the work may be rapid although the cutting operation itself may be slow.

The primary object of the present invention is to generally improve such power feed mechanisms. A more particular object is to provide improved means whereby the motor or air cylinder may be axially aligned with the horizontal shaft of the turret. A further object is to provide improved means for rapid approach, slow cutting movement, and rapid return of the turret. Still another object is to provide improved means for independent adjustment of the point at which the slow cutting movement begins for each station of the turret.

Still another object of the present invention is to provide for independent adjustment of the rate of movement during the cutting operation, for each of the stations. The rapid approach may be carried to a point just short of the start of the work performed by the particular tool of that station, and still another object of the invention is to so arrange the latter independent adjustments that changing one or another does not change the cutting rate adjustment for the same station, and vice versa. Still another object is to retain the motion limit or stop-screw adjustment heretofore provided on the turret assembly, so that no additional mechanism is needed for that function.

To accomplish the foregoing general objects, and other more specific objects which will hereinafter appear, my invention resides in the power feed mechanism and the elements thereof and their relation one to another, as are hereinafter more particularly described in the following specification. The specification is accompanied by drawings, in which Fig. 1 is a plan view of a power feed mechanism embodying features of my invention;

Fig. 2 is a front elevation of the same;

Fig. 3 is a partially sectioned elevation of the motor and oil-check end of the mechanism;

Fig. 4 is a fragmentary section drawn to enlarged scale and explanatory of a detail;

Fig. 5 is a partially sectioned mostly horizontal view through the forward portion of the mechanism;

Fig. 6 is a partially sectioned fragmentary elevational view of the forward end of the mechanism, as applied to a turret;

Fig. 6A is an end view of a coupling flange at the forward end of the finger shaft;

Fig. 7 is a transverse section taken approximately in the plane of the line 7—7 of Fig. 6;

Fig. 7A is a transverse vertical section taken approximately in the plane of the line 7A—7A in Fig. 8;

Fig. 8 shows the accessory applied to a hand screw machine;

Fig. 9 is a transverse section taken approximately in the plane of the line 9—9 of Fig. 4 and drawn to large scale;

Fig. 10 is a wiring diagram showing the circuitry of the apparatus;

Fig. 11 is a fragmentary section similar to a part of Fig. 5 but showing the relation of the parts during the slow-speed cutting operation; and Fig. 12 is a fragmentary section on the line 12—12 of Fig. 11.

Referring to the drawing, and more particularly to Fig. 8, the power feed mechanism is shown applied to a typical hand screw machine. The latter comprises a bed 12, and a head stock 14 carrying a piece of work 16. This is worked on successively by a series of tools carried by a tool turret 18. The turret is rotatably mounted on a turret slide 20 which is horizontally slidable in a turret block 22. The latter is fixedly mounted on bed 12 in lieu of an ordinary tail stock. The turret slide 20 includes a horizontal turret shaft, the rear end of which projects from the turret slide and carries a drum or collar 24. This is fitted with a series of independently adjustable stop-screws 26 which limit the forward movement of the turret slide. There is one stop-screw for each station on turret 18, and thus the forward motion permitted for each tool is independently adjustable. In a typical case, the turret will have six stations for six tools, and collar 24 then will be provided with six stop-screws 26. Also, in a typical case, it is the bottom stop-screw which corresponds to the forward station or working tool.

The power feed mechanism of the present invention comprises a motor cylinder, or more specifically an air cylinder 30, with a forwardly projecting piston rod, not visible in Fig. 8. One advantage of the present mechanism is that this motor cylinder 30 is axially aligned with the horizontal turret shaft, and thus its thrust is advantageously centrally applied.

The rapid advance and return is arrested and slowed during the cutting operation by means of an oil-check 32, preferably disposed collaterally of the air cylinder 30, as shown. A rotatable coupling means 34 is preferably disposed between and connects the turret 20 to the motor cylinder 30. This coupling means is preferably a shaft which may be called a finger shaft because it carries certain independently adjustable push fingers and pins, as is described in greater detail later. The piston rod of oil check 32 is shown at 44, and the parts are steadied by a horizontally slidable guide sleeve 46.

Referring now to Figs. 1 and 2 of the drawing, the rotatable coupling means or finger shaft 34 is connected to the turret (not shown) at 36, and moves longitudinally with the turret and rotatably with the turret shaft. The finger shaft 34 carries a wheel 38 provided with a ring of longitudinally adjustable fingers 40. A means 42 is located in the path of one of the fingers 40 and the means 42 (later called a rocker housing) is connected, as described later, to the oil-check 32.

In the present case, the oil-check is an oil-filled cylinder housing a piston, and a piston rod 44 (Fig. 2) leads to the piston. The connection between the means 42 and the check rod 44 is indirect and, considered more specifically, the means 42 is secured to a horizontal sleeve 46 which is slidable longitudinally, and this sleeve carries a clamp 48 which is secured to oil-check rod 44 by means of adjusting nuts 50. The sleeve 46 is itself slidable on a stationary guide rod 52, and thus the sleeve 46 acts as a guide for the associated parts of the mechanism.

Referring now to Fig. 5 of the drawing, it will be seen that the fingers 40 are externally threaded, and are received in threaded holes in the finger wheel 38. In this way, the position of each finger is readily longitudinally adjustable, and the adjustment may be locked by appropriate locking screws 54, there being one for each finger. The action of the particular lock here used is shown in Fig. 7, there being an inner locking plug 56 and an outer locking plug 58, which may be drawn together by rotation of a locking screw 54 passing through plug 58 and threaded in plug 56. By tightening the screw, the plugs are drawn together against one side of the finger 40, thus locking the same against rotation. Similar locking mechanism is provided for each of the six fingers.

Reverting now to Figs. 1 and 2, the motor 30 causes rapid advance of the finger shaft 34 and the turret until the finger 40 reaches the means 42, which is disposed in the path of only one finger, and that finger corresponds to the working station or tool of the turret. When the finger 40 reaches the means 42 the latter is bodily moved, and with it the guide sleeve 46, the clamp 48 thereon, and the check rod 44, so that any additional movement is at the slow rate permitted by oil-check 32. The point at which the slow motion begins depends on the adjustment of the particular finger 40, and may be a different point for each tool, depending, of course, on the point at which that particular tool is intended to engage the work.

The action of the oil-check may be explained with reference to Fig. 3 of the drawing. The check rod 44 is secured to a piston 62 slidable in a cylinder 64. The cylinder is filled with oil (not shown) on both sides of the piston 62. As the piston moves to the left, oil may leak or pass slowly from the left to the right side of the piston, at a rate determined by a tiny aperture or leak passage located at 66. Considered in greater detail, oil flows through radial holes 68 to an axial passage 70 and thence to the inside of a cap 72, and then through passage 66 to the right side of the piston. For a reason explained later, passage 66 is preferably a tapered groove in a pin 74, and this detail is more clearly shown in Figs. 4 and 9.

Reverting to Fig. 3, return movement of piston 62 is unimpeded, because quick release is provided by a relatively large disc-shaped check valve 76. This closes the ends of a number of relatively large holes 78 through the piston 62. The disc 76 is normally closed by a light spring washer 80 bearing against a covering disc 82. Thus, the passages 78 are closed during movement of piston 62 to the left, but freely open during movement of piston 62 to the right.

An oil take-up means is preferably provided, and in the present case this comprises an additional piston 84 urged to the left by a compression spring 86. There is also an oil reservoir at 88 to insure that the oil check cylinder 64 is kept full. One purpose of piston 84 is to compensate for the change in oil volume which accompanies movement of piston 62, by reason of the change in contained length of the piston rod 44. However, the details of the oil check, apart from the rate adjustment later described, are not new and form no part of the present invention.

Reverting to Figs. 1 and 2, the motor 30 includes a pick-up arm 90 which co-operates with a projection 92 on the guide sleeve 46. With this arrangement, the arm 90 picks up the projection 92 near the end of the rapid return movement of the turret, and so insures restoration of the oil-check to initial position. Differently expressed, the oil-check has only a short movement, corresponding to the actual cutting action of the tool, and there is considerable lost motion between the finger shaft 34 and the oil-check. This lost motion is provided in one direction by the finger 40, which does not act during rapid advance of the finger shaft 34 until it reaches the means 42, and in the other direction by the pick-up arm 90, which does not act during rapid return until it reaches the projection 92.

As so far described, the slow-speed cutting movement would be at the same speed or rate for all of the tools. In accordance with a further feature of the present invention, this cutting rate (or oil-check rate) is independently adjustable for each tool. The mechanism for this may be explained with reference to Fig. 5 of the drawing, in which it will be seen that the finger shaft 34 carries independently longitudinally adjustable pins 100. The pins 100 may be carried by the wheel 38 previously described. It will be understood that there are as many pins as there are fingers and stations, and the pins serve for rate adjustment. In preferred form, each pin is carried by and projects forwardly from its associated thrust finger 40, and at the top of Fig. 5 it will be seen that pin 100 passes through and is slidable in finger 40. Its position is adjustable by means of an adjusting screw 102 threadedly received in finger 40.

Referring now to Figs. 3 and 4, the pin 74 with its tapered leak passage 66, is carried by or formed integrally with a rod 104 which extends axially through the piston rod 44 of the oil-check. Rod 104 is considerably smaller in diameter than the passage through the rod, thus providing clearance for flow of oil through radial passages 68 to cap 72.

Reverting now to Fig. 5, the rate rod 104 terminates at its left end in a tip 106. It is urged to the left by a compression spring 108 bearing against a disc 110. The tip 106 is disposed in the path of a rocker 112, 114 pivoted at 116 in a slot in the means 42 previously referred to. The end 114 of the rocker is disposed in the path of rate pin 100. The pin is much smaller in diameter than the finger 40. Referring now to Fig. 12, rocker 114 is housed in a mating slot 118, which is only a little wider than pin 100, thus leaving adequate surface on each side of slot 118 on which the end of finger 40 may thrust. This is shown too in Fig. 7, in which finger 40 is much wider than slot 118 housing the rocker.

Reverting now to Fig. 5, the projection of pin 100 is such that it reaches and moves the rocker 114 before finger 40 moves the rocker housing 42. Thus, the desired or adjusted check rate is established before the oil-check action begins. Comparison may be made between Figs. 5 and 11. In Fig. 5, the rocker is in clockwise position, as determined by the compression spring 108. In Fig. 11, the rocker has been turned in counterclockwise direction by the action of pin 100, and it remains in fixed adjustment during the ensuing movement caused by the thrust of finger 40 on rocker housing 42 and the connected oil-check.

From inspection of Fig. 5, it will be seen that the pin 100 is independently adjustable for each station of the turret; that the finger 40 is independently adjustable for each station of the turret; and that the pin 100 and finger 40 of a single station are adjustable independently of one another. However, in setting up the turret, if the cutting rate is satisfactory at a particular station, but the starting point is to be changed, one convenience in the present mechanism is that a change in adjustment of thrust finger 40 does not change the rate adjustment of its contained pin 100, and readjustment of the pin is therefore not necessary.

It will be understood that with the particular slope of leak passage here shown, when the pin 100 projects further out of the thrust finger 40, the cutting rate is slow, and when the projection of the pin 100 is small, the cutting rate is fast.

The control of the mechanism in the present case is electrical, and, referring to Figs. 1 and 2, the motor 30 is an air cylinder having a solenoid-operated air valve mounted on its right end, this valve being generally designated at 120. The admission of air to the right end of the cylinder is directly from the valve body, while the flow of air to the left end of the cylinder may be through a collateral air pipe 122. Such an air cylinder and valve assembly is commercially available, an example being the Valve-In-Head Cylinder, Model SVS–R, manufactured by The A. K. Allen Co. of Mineola, New York.

A starting button 124 may be mounted at any convenient point on the screw machine, and in the present case is mounted beneath the base 140 (Fig. 2). A line switch or master switch also may be provided at any convenient point. In Figs. 1 and 2, attention is directed to the unit 126, which is a pressure-responsive switch, and to the element 128, which is a microswitch operated by a projection 130 on the guide sleeve 46. This is hereafter called a "forward switch," because it is operated when the turret has been returned to its back position, and this change initiates the next forward movement. The pressure switch 126 then is subjected to pressure and is operated. Pressure switch 126 is again changed back to original position when there is no longer any forward or cutting movement of the tool, because then the pressure on the left side of the piston in the oil-check falls off, and this initiates the return movement of the turret after it has completed its forward movement.

Another microswitch is shown at 134 (Fig. 1). This is a stop-cycle switch, which stops the repeated action of the air cylinder after the turret has gone through one complete tool cycle. For this purpose the finger wheel 38 is provided at one point with a rounded camming projection 136. The projection is conveniently provided at the end of one of the locking screws previously described at 58 in Fig. 7, that is, one of these screws has the rounded camming projection as its head. When the finger wheel 38 turns one full revolution and comes back to a position corresponding to the first tool station, the microswitch 134 is changed and the operation is stopped unless and until the starting button is again pressed.

Referring now to Fig. 10 of the drawing, the solenoid of the solenoid valve is indicated at 121. Power is supplied across any suitable line marked L1, L2. A master or line switch is provided at 132. The start button is shown at 124; the pressure switch at 126; and the forward switch at 128. The stop-cycle switch, which is normally closed throughout the operation, but which opens at the end of one complete cycle of the turret, is shown at 134. Thus, in the present case, switch 134 opens after six forward and return movements of the turret.

On reflection, it will be understood that at the beginning when line switch 132 is closed, the circuit remains open because stop-cycle switch 134 and start button 124 are both open. The forward switch 128 is closed, and pressure switch 126 is open. The operator touches button 124, thereby energizing solenoid 121 and so advancing the turret. The stop-cycle switch 134 immediately closes and thus the circuit remains closed despite release of start button 124. The forward switch 128 remains closed during the rapid thrust of the air motor 30, because the guide sleeve 46 does not yet move. At the beginning of the tool operation, the forward switch 128 opens, but simultaneously the pressure switch 126 closes, and thus forward movement of the turret is continued. The forward switch 128 has an appreciable range of movement or lost motion, such that the pressure builds up and pressure switch 126 is closed before the forward switch 128 is opened.

At the end of the tool operation when the turret can no longer move because the stop-screw 26 (Fig. 8) of the turret itself comes into play, the pressure falls off and pressure switch 126 opens and the turret is returned to initial position. At the end of the return movement the forward switch 128 closes, whereupon the turret is again moved forward, and so on. It will be understood that during each return movement, the turret is indexed to the next tool by the conventional indexing mechanism which forms a part of the turret itself. This indexing action is transmitted to the finger shaft 34, so that each time a different rate pin 100 (Fig. 5) and push finger 40 comes into operation. On completion of the return movement after the sixth station, the stop-cycle switch 134 is opened, thus de-energizing the entire circuit.

Some additional structural details may be described as follows. The power feed mechanism is mounted on a base 140 (Fig. 8), with upstanding ends 142 and 144. The guide rod 52 is fixedly carried by the ends 142 and 144.

Referring now to Fig. 5, there are anti-friction bearings 146 between the guide sleeve 46 and the guide rod 52. The clamp 48 is split at 148 and is clamped on the guide sleeve 46 by means of a screw 150. Referring next to Fig. 7, the thrust receiving means or rocker housing 42 is split at 152 and is clamped to the guide sleeve 46 by means of a clamp screw 154. The necked or triangular shape of member 42 ensures that it will be pushed by only one of the adjustable fingers 40.

The thrust connection between the piston rod of the cylinder and the push finger shaft may be described with reference to Fig. 5 of the drawing. Shaft 34 terminates at 200, where it directly abuts the face 202 of a bearing cup or socket 204 formed in the end of piston rod 206. A radial bearing 208 may be disposed between the said end of the finger shaft 34 and piston rod 206, it being understood that the latter preferably does not rotate, whereas the former must.

As so far described, the motor or piston rod 206 would advance but would not return the finger shaft 34. For the latter purpose, shaft 34 is grooved and provided with a snap ring 210. A cup 212 is threadedly received on piston rod 206 as indicated at 214. A thrust bearing 216 is preferably interposed to ease rotation of finger shaft 34 during retraction.

The finger wheel 38 is mounted on shaft 34, and the main requirement is to withstand the forward thrust, there being no load during retraction. For this purpose, shaft 34 is provided with an annular groove indicated at 220, and this receives the two halves of a sturdy split ring 222. The latter is received within an internally hollowed part of a hub 224 formed integrally with the wheel 38. The hub 224 is alone sufficient to keep the halves of ring 222 in the groove 220, the parts being assembled by sliding the wheel and hub rearwardly over the split ring. The finger wheel thereafter remains frictionally in position. If desired a snap ring may be added in front of the wheel.

The shaft 34 is shown slidable through an extension of the thrust receiving member or rocker housing 42, as indicated at 230. While this is not essential, it is greatly preferred to extend the member 42 leftward as viewed at 43 in Fig. 7 to fit around the finger shaft 34, in order to help take the thrust of the finger 40. Referring to Fig. 11, when finger 40 bears against member 42, it tends to tilt it despite the clamping of member 42 on the relatively large diameter guide cylinder 46 (Figs. 5 and 7). Inasmuch as finger shaft 34 and member 42 move along together from this point on, any slight tilting of member 42 does no harm, and indeed helps lock member 42 directly to the finger shaft 34, which is desirable.

The coupling of the finger shaft 34 to the turret slide may be described with reference to Figs. 5 and 6 of the drawing. The forward end of finger shaft 34 has a flange 160 (also shown in Fig. 6A) which is enclosed within a housing 162, and the latter carries a push cylinder or ring 163. The rear end of this bears against the flange 160, and the forward end reaches the forward face of the housing 162, so that the forward end of the push ring bears directly against the rear end of the turret slide casting immediately surrounding the stop-screw drum 24 (Fig. 6) of the turret. It will thus be evident that the forward thrust of the finger shaft 34 will be applied from flange 160 to ring 163 and then directly to the main body or casting 20 of the turret slide.

To insure return movement, the housing 162 is bolted to the turret slide, and for this purpose has outwardly projecting ears 232 and 234, the shape of which will also be seen in Fig. 7A in which 22 represents the stationary turret block, while 20 represents the rear end of the turret slide which is slidable in the block 22. The housing 162 with its ears 232 and 234 are also shown in Figs. 1 and 2. Reverting to Fig. 5, a thrust bearing 164 is preferably provided between the back of the housing 162 and the adjacent flange 160, which reduces friction during retraction of the turret slide.

It will be understood that the housing 162 and the push ring 163 freely surround the stop-screw drum 24 which forms a part of the turret slide. This drum is omitted in Fig. 5 but is shown in Fig. 6. The push ring 163 is longer in axial direction than the drum, and the forward thrust therefore is not exerted on the drum or the internal mechanism of the turret. There is accordingly no interference with rotation of the drum, and neither the forward nor return thrust is applied to the drum 24. Moreover, a large center hole 236 through the rear face of housing 162 is sufficiently large to accommodate the six rearwardly projecting stop-screws 26, two of which are shown in Fig. 6.

The drum 24 of the turret is rotatably coupled to the flange 160. For this purpose it is provided with at least one and preferably a plurality of projecting pilot or dowel pins, which are received in mating holes in flange 160. The location of two such pins is shown at 238 in Fig. 6A. This figure also shows the ring of six oversized holes 240 through which the stop-screws 26 of the turret freely pass.

In Fig. 6A it will be seen that the periphery of flange 160 is notched with six indexing notches 242. A spring-pressed ball 170 cooperates with these notches to help properly index the finger shaft. This is preferably done even though the turret itself has indexing and detent means. Fig. 6 shows the housing 172 for a compression spring 174 and stud 176 which bears against the ball 170. The housing 172 is secured to the top of the main housing 162, as will be seen in Figs. 1 and 2. The air cylinder 30 and finger shaft 34 drive the turret forward and back, but it is the indexing of the turret that also indexes the finger shaft 34.

Leakage of oil from the oil check 32 (Fig. 3) to the forward end of its piston rod 44 around the rate rod 104 is prevented by an appropriate oil-seal surrounding the rate rod, and this seal is shown in Fig. 6 at 105. The details of the seal are not important, there being essentially a threaded gland which bears against compressible packing, but it will be understood that the rate rod 104 remains axially slidable, and is reset for each tool station at the beginning of each tool operation.

Reverting to Fig. 3, the pressure-responsive switch previously referred to is shown at 126 below the oil-check cylinder 64. The unit 250 shown above the cylinder is an air bleed which facilitates ridding the oil of entrapped air.

Operation

Referring to Fig. 8, the accessory is mounted on the screw-machine by bolting the forward end of the base 140 of the accessory thru the ways of the bed 12 of the screw-machine. The accessory is so located that the finger shaft and air cylinder 30 are axially aligned with the horizontal indexing shaft of the turret slide. The turret slide is moved back until the stop screw drum 24 is received within the housing 162 with the thrust ring (163 in Fig. 6) therebetween. At this time, the stop screws 26 pass freely through the six holes in the flange 160 (Fig. 6) of the finger shaft and, of course, through the large hole 236 of the back plate 161 of the housing 162. The drum 124 is properly registered with the flange 160, that is, the dowels and holes are mated at 238 (Figs. 6 and 6A). It will be noted in Fig. 6A that the holes 238 are not diametrically located, and therefore the parts can come together in only one orientation, which is desirable because of the cycle stop-switch 134 (Fig. 1), and also to restore proper registration with previously adjusted push fingers and stop-screws in the event the turret is separated from the accessory for servicing.

When the parts have been properly brought together, as described, the housing 162 is secured to the rear end of the turret slide 20 by two screws passing through the ears 232, 234 of the housing (Figs. 1, 2, 5 and 7A) and threadedly received in the cast body of the turret slide. This connection usually is the only machine work that need be done on the screw machine itself.

Referring to Fig. 8, the turret 18 is fitted in the usual manner with appropriate tools for the desired operations to be performed on the work 16. The stop-screws 26 of the turret are appropriately adjusted in usual fashion to limit the maximum forward movement of the turret slide 20 for each tool operation.

Referring now to Fig. 1, the fingers 40 next are individually adjusted to mark the beginning of each tool operation, so that there will be a rapid forward movement or approach, with the slow cutting movement beginning only where needed. The adjustment of each finger 40 is locked by its lock-screw 54.

The different tool operations may be capable of different cutting rates. The rate pins 100 projecting through the fingers 40 are next adjusted to provide a desired cutting rate for each tool. Ordinarily this will require some trial and error after operating on a number of pieces.

If in the course of work it is found desirable to slightly readjust the stop-screws 26 of the turret, these are accessible for the purpose. The stop-screw adjustments are locked by individual locking-screws shown at 25 in Fig. 6, and these are accessible through large holes in the thrust ring 163, said holes being shown at 27 in Fig. 5. The latter are themselves accessible because the housing 162 is open entirely around its bottom, that is, it has a full rear wall 161, but only an approximately semi-cylindrical top wall, and no bottom wall. This is shown at the left end of Figs. 2 and 6.

If in the course of operation it is found desirable to readjust the rapid approach distance, that is, the fingers 40, this may be done without in any way upsetting or changing the rate adjustment, for the latter depends on the projection of the rate pin 100 relative to the finger 40, and not on the absolute position of the rate pin.

To start the work, the operator presses the start button 124, following which the turret is advanced at high speed to the approach position, whereupon the rate pin 100 tilts rocker 112, 114, which shifts the rate rod to set the leak passage (66 in Figs. 3 and 4) at desired adjustment. Immediately thereafter finger 40 bears against and moves rocker housing 42, which in turn moves the guide sleeve 46 and the oil-check piston, so that the forward movement becomes gradual instead of rapid. The cutting operation proceeds until positively stopped by the stop-screw 26 of the turret, whereupon the drop in oil pressure on the left side of the oil-check piston operates the pressure switch and reverses the air motor 30, which rapidly pulls the turret slide back to retracted position.

Near the end of this return movement, the arm 90 (Fig. 1) picks up the guide sleeve 46 and retracts it along with the oil-check piston. The latter moves back freely, because check valve 76 (Fig. 3) opens, and completion of the return movement of the guide sleeve 46 operates the forward switch 128, whereupon the air motor 30 again advances the turret slide for another high speed approach to the next cutting operation. This proceeds until the turret has made one full rotation, whereupon the final retraction operates the stop-cycle switch 134, and the mechanism remains at rest. The operator then removes the finished piece from the screw-machine, and mounts a fresh blank 16 (Fig. 1) in the screw-machine, whereupon it is merely necessary for him to again touch the start button 124.

It is believed that the construction and operation of my improved power-feed mechanism, as well as the advantages thereof, will be apparent from the foregoing detailed description. It will also be apparent that while I have shown and described my invention in a preferred form, changes may be made in the structure shown without departing from the scope of the invention, as sought to be defined in the following claims.

I claim:

1. Power feed mechanism for the tool-carrying turret assembly of a hand screw machine, said turret assembly having a turret slide, a turret, and a turret shaft, said power feed mechanism comprising a double-acting motor cylinder, a rotatable finger shaft connected to the turret shaft for movement therewith by said motor, an oil check, a finger wheel on the finger shaft, longitudinally adjustable fingers on the finger wheel, said fingers corresponding to the turret stations, means in the path of a finger connected to the oil check, whereby rapid approach and slow cutting movement are provided, and whereby the point at which slow cutting movement begins is independently adjustable for each station of the turret, independently longitudinally adjustable pins carried by said finger shaft, said pins corresponding to the turret stations, a rate-controlling means forming a part of said oil check and having a variable passage to vary the oil check rate, and means in the path of a pin corresponding to the operative turret station to shift the position of the rate controlling means for a desired check rate for a particular station, whereby the check rate as well as the starting point of slow movement are each independently adjustable for each station.

2. Power feed mechanism for the tool-carrying turret assembly of a hand screw machine, said turret assembly having a turret slide, a turret, and a turret shaft, said power feed mechanism comprising a double-acting motor cylinder, a rotatable finger shaft connected to the turret shaft for movement therewith by said motor, an oil check, a finger wheel on the finger shaft, longitudinally adjustable fingers on the finger wheel, said fingers corresponding to the turret stations, means in the path of a finger connected to the oil check, whereby rapid approach and slow cutting movement are provided, and whereby the point at which slow cutting movement begins is independently adjustable for each station of the turret, independently longitudinally adjustable pins carried by said finger shaft, said pins corresponding to the turret stations, a rate-controlling means forming a part of said oil check and having a variable passage to vary the oil check rate, means in the path of a pin corresponding to the operative turret station to shift the position of the rate controlling means for a desired check rate for a particular station, whereby the check rate as well as the starting point of slow movement are each independently adjustable for each station, and means whereby adjustment of a finger is accompanied by a commensurate adjustment of its corresponding pin such that a change in starting point does not change the check rate.

3. Power feed mechanism for the tool-carrying turret assembly of a hand screw machine, said turret assembly having a turret slide, a turret, a turret shaft, stop screws and indexing means, said power feed mechanism comprising a double-acting motor cylinder axially aligned with the turret shaft, a rotatable finger shaft located between and connecting the turret shaft and the motor in axial alignment, a one-way oil check, a finger wheel on the finger shaft, longitudinally adjustable fingers on the finger wheel, said fingers corresponding to the turret stations, means in the path of a finger connected to the oil check, whereby rapid approach and slow cutting movement and rapid return of the turret are provided, and whereby the point at which slow cutting movement begins is independently adjustable for each station of the turret, independently longitudinally adjustable pins carried by said finger shaft, said pins corresponding to the turret stations, a rate-controlling means forming a part of said oil check and having a variable passage to vary the oil check rate, and means in the path of a pin corresponding to the operative turret station to shift the position of the rate controlling means for a desired check rate for a particular station, whereby the check rate as well as the starting point of slow movement are each independently adjustable for each station.

4. Power feed mechanism for the tool-carrying turret assembly of a hand screw machine, said turret assembly having a turret slide, a turret, a turret shaft, stop screws and indexing means, said power feed mechanism comprising a double-acting motor cylinder axially aligned with the turret shaft, a rotatable finger shaft located between and connecting the turret shaft and the motor in axial alignment, a one-way oil check, a finger wheel on the finger shaft, longitudinally adjustable fingers on the finger wheel, said fingers corresponding to the turret stations, means in the path of a finger connected to the oil check, whereby rapid approach and slow cutting movement and rapid return of the turret are provided, and whereby the point at which slow cutting movement begins is independently adjustable for each station of the turret, independently longitudinally adjustable pins carried by said finger shaft, said pins corresponding to the turret stations, a rate-controlling means forming a part of said oil check and having a variable passage to vary the oil check rate, means in the path of a pin corresponding to the operative turret station to shift the position of the rate controlling means for a desired check rate for a particular station, whereby the check rate as well as the starting point of slow movement are each independently adjustable for each station, and means whereby adjustment of a finger is accompanied by a commensurate adjustment of its corresponding pin such that a change in starting point does not change the check rate.

5. Power feed mechanism for the tool-carrying turret assembly of a hand screw machine, said turret assembly having a turret slide, a turret, and a turret shaft, said power feed mechanism comprising a double-acting motor cylinder, a rotatable finger shaft connected to the turret shaft for movement therewith by said motor, an oil check, a finger wheel on the finger shaft, longitudinally adjustable fingers on the finger wheel, said fingers corresponding to the turret stations, means in the path of a finger connected to the oil check, whereby rapid approach and slow cutting movement are provided, and whereby the point at which slow cutting movement begins is independently adjustable for each station of the turret, independently longitudinally adjustable pins carried by said finger wheel, said pins corresponding to the turret stations, a rate-controlling rod forming a part of said oil check and having a tapered passage to vary the oil check rate, said means in the path of the operative finger acting as a rocker mounting, a rocker on said mounting, one end of said rocker being in the path of said adjustable pin and the other end being adjacent the rate rod, whereby the check rate as well as the starting point of slow movement are each independently adjustable for each station.

6. Power feed mechanism for the tool-carrying turret assembly of a hand screw machine, said turret assembly having a turret slide, a turret, and a turret shaft, said powed feed mechanism comprising a double-acting motor cylinder, a rotatable finger shaft located between and connecting the turret shaft and the motor, an oil check, a finger wheel on the finger shaft, longitudinally adjustable fingers on the finger wheel, said fingers corresponding to the turret stations, means in the path of a finger connected to the oil check, whereby rapid approach and slow cutting movement are provided, and whereby the point at which slow cutting movement begins is independently adjustable for each station of the turret, independently longitudinally adjustable pins carried by said finger wheel, said pins corresponding to the turret stations, a rate-controlling rod forming a part of said oil check and having a tapered passage to vary the oil check rate, said means in the path of the operative finger acting as a rocker mounting, a rocker on said mounting, one end of said rocker being in the path of said adjustable pin and the other end being adjacent the rate rod, whereby the check rate as well as the starting point of slow movement are each independently adjustable for each station, and means whereby adjustment of a finger is accompanied by a commensurate adjustment of its corresponding pin such that a change in starting point does not change the check rate.

7. Power feed mechanism for the tool-carrying turret assembly of a hand screw machine, said turret assembly having a turret slide, a turret, a turret shaft, stop screws and indexing means, said power feed mechanism comprising a double-acting motor cylinder axially aligned with the turret shaft, a rotatable finger shaft located between and connecting the turret shaft and the motor in axial alignment, a one-way oil check, a finger wheel on the finger shaft, longitudinally adjustable fingers on the finger wheel, said fingers corresponding to the turret stations, means in the path of a finger connected to the oil check, whereby rapid approach, slow cutting movement, and rapid return of the turret is provided, and whereby the point at which slow cutting movement begins is independently adjustable for each station of the turret, independently longitudinally adjustable pins carried by said finger wheel, said pins corresponding to the turret stations, a rate-controlling rod forming a part of said oil check and having a tapered passage to vary the oil check rate, said means in the path of the operative finger acting as a rocker mounting, a rocker on said mounting, one end of said rocker being in the path of said adjustable pin and the other end being adjacent the rate rod, whereby the check rate as well as the starting point of slow movement are each independently adjustable for each station.

8. Power feed mechanism for the tool-carrying turret assembly of a hand screw machine, said turret assembly having a turret slide, a turret, a turret shaft, stop screws and indexing means, said power feed mechanism comprising a double-acting motor cylinder axially aligned with the turret shaft, a rotatable finger shaft located between and connecting the turret shaft and the motor in axial alignment, a one-way oil check, a finger wheel on the finger shaft, longitudinally adjustable fingers on the finger wheel, said fingers corresponding to the turret stations, means in the path of a finger connected to the oil check, whereby rapid approach, slow cutting movement, and rapid return of the turret is provided, and whereby the point at which slow cutting movement begins is independently adjustable for each station of the turret, independently longitudinally adjustable pins carried by said finger wheel, said pins corresponding to the turret stations, a rate-controlling rod forming a part of said oil check and having a tapered passage to vary the oil check rate, said means in the path of the operative finger acting as a rocker mounting, a rocker on said mounting, one end of said rocker being in the path of said adjustable pin and the other end being adjacent the rate rod, whereby the check rate as well as the starting point of slow movement are each independently adjustable for each station, and means whereby adjustment of a finger is accompanied by simultaneous equal adjustment of its corresponding pin, so that a change in starting point does not change the check rate.

9. Power feed mechanism for the tool-carrying turret assembly of a hand screw machine, said turret assembly having a turret slide, a turret, and a turret shaft, said power feed mechanism comprising a double-acting motor cylinder, a rotatable finger shaft located between and connecting the turret shaft and the motor, an oil check, a finger wheel on the finger shaft, longitudinally adjustable fingers on the finger wheel, said fingers corresponding to the turret stations, means in the path of a finger connected to the oil check, whereby rapid approach and slow cutting movement are provided, and whereby the point at which slow cutting movement begins is independently adjustable for each station of the turret, independently longitudinally adjustable pins received in and projecting forwardly from said adjustable fingers, a rate-controlling rod forming a part of said oil check and having a tapered passage to vary the oil check rate, said means in the path of the operative finger acting as a rocker housing, a rocker on said housing, one end of said rocker being in the path of said adjustable pin and the other end being adjacent the rate rod, whereby the check rate as well as the starting point of slow movement are each independently adjustable for each station.

10. Power feed mechanism for the tool-carrying turret assembly of a hand screw machine, said turret assembly having a turret slide, a turret, a turret shaft, stop screws and indexing means, said power feed mechanism comprising a double-acting motor cylinder axially aligned with the turret shaft, a rotatable finger shaft located between and connecting the turret shaft and the motor in axial alignment, a one-way oil check, a finger wheel on the finger shaft, longitudinally adjustable fingers on the finger wheel, said fingers corresponding to the turret stations, means in the path of a finger connected to the oil check, whereby rapid approach and slow cutting movement and rapid return of the turret are provided, and whereby the point at which slow cutting movement begins is independently adjustable for each station of the turret, independently longitudinally adjustable pins received in and projecting forwardly from said adjustable fingers, a rate-controlling rod forming a part of said oil check and having a tapered passage to vary the oil check rate, said means in the path of the operative finger acting as a rocker housing, a rocker on said housing, one end of said rocker being in the path of said adjustable pin and the other end being adjacent the rate rod, whereby the check rate as well as the starting point of slow movement are each independently adjustable for each station.

11. Power feed mechanism for the tool-carrying turret assembly of a hand screw machine, said turret assembly having a turret slide, a turret, and a turret shaft, said power feed mechanism comprising a double-acting motor cylinder, a rotatable finger shaft connected to the turret shaft for movement therewith by said motor, an oil check, a finger wheel on the finger shaft, longitudinally adjustable fingers on the finger wheel, said fingers corresponding to the turret stations, means in the path of a finger connected to the oil check, whereby rapid approach and slow cutting movement are provided, and whereby the point at which slow cutting movement begins is independently adjustable for each station of the turret, independently longitudinally adjustable pins carried by said finger shaft, said pins corresponding to the turret stations, a rate-controlling means forming a part of said oil check and having a variable passage to vary the oil check rate, and means in the path of a pin corresponding to the operative turret station to shift the position of the rate controlling means for a desired check rate for a particular station, whereby the check rate as well as the starting point of slow movement are each independently adjustable for each station, a solenoid valve to control the motor cylinder, and circuitry including a start switch button, a switch which changes on return of the turret to again advance the turret, a pressure switch connected to the forward side of the oil check to return the turret after full forward movement permitted by adjustment of the turret stop-screw, and a stop-cycle switch to stop operation after the turret has gone through a full cycle.

12. Power feed mechanism for the tool-carrying turret assembly of a hand screw machine, said turret assembly having a turret slide, a turret, and a turret shaft, said power feed mechanism comprising a double-acting motor cylinder, a rotatable finger shaft located between and connecting the turret shaft and the motor, an oil check, a finger wheel on the finger shaft, longitudinally adjustable fingers on the finger wheel, said fingers corresponding to the turret stations, means in the path of a finger connected to the oil check, whereby rapid approach and slow cutting movement are provided, and whereby the point at which slow cutting movement begins is independently adjustable for each station of the turret, independently longitudinally adjustable pins carried by said finger wheel, said pins corresponding to the turret stations, a rate-controlling rod forming a part of said oil check and having a tapered passage to vary the oil check rate, said means in the path of the operative finger acting as a rocker mounting, a rocker on said mounting, one end of said rocker being in the path of said adjustable pin and the other end being adjacent the rate rod, whereby the check rate as well as the starting point of slow movement are each independently adjustable for each station, and means whereby adjustment of a finger is accompanied by a commensurate adjustment of its corresponding pin such that a change in starting point does not change the check rate, a solenoid valve to control the motor cylinder, and circuitry including a start switch button, a switch which changes on return of the turret to again advance the turret, a pressure switch connected to the forward side of the oil check to return the turret after full forward movement permitted by adjustment of the turret stop-screw, and a stop-cycle switch to stop operation after the turret has gone through a full cycle.

13. Power feed mechanism for the tool-carrying turret assembly of a hand screw machine, said turret assembly having a turret slide, a turret, a turret shaft, stop screws and indexing means, said power feed mechanism comprising a double-acting motor cylinder axially aligned with the turret shaft, a rotatable finger shaft located between and connecting the turret shaft and the motor in axial alignment, a one-way oil check, a finger wheel on the finger shaft, longitudinally adjustable fingers on the finger wheel, said fingers corresponding to the turret stations, means in the path of a finger connected to the oil check, whereby rapid approach, slow cutting movement, and rapid return of the turret is provided, and whereby the point at which slow cutting movement begins is independently adjustable for each station of the turret, independently longitudinally adjustable pins projecting forwardly from fingers, a rate-controlling rod forming a part of said oil check and having a tapered passage to vary the oil check rate, said means in the path of the operative finger acting as a rocker housing, a rocker on said housing, one end of said rocker being in the path of said adjustable pin and the other end being adjacent the rate rod, whereby the check rate as well as the starting point of slow movement are each independently adjustable for each station, a solenoid valve to control the motor cylinder, and circuitry including a start switch button, a switch which changes on return of the turret to again advance the turret, a pressure switch connected to the forward side of the oil check to return the turret after full forward movement permitted by adjustment of the turret stop-screw, and a stop-cycle switch to stop operation after the turret has gone through a full cycle.

References Cited in the file of this patent
UNITED STATES PATENTS

| | | |
|---|---|---|
| 490,864 | Conradson | Jan. 31, 1893 |
| 2,063,414 | Tweddell | Dec. 8, 1936 |
| 2,071,786 | Ferris | Feb. 23, 1937 |
| 2,627,646 | Perry | Feb. 10, 1953 |
| 2,642,649 | Shadrick | June 23, 1953 |
| 2,729,077 | Halloway | Jan. 3, 1956 |
| 2,776,584 | Burg | Jan. 8, 1957 |